April 8, 1958 W. D. TEAGUE, JR 2,829,491
TWO-STAGE LIQUID FUEL ROCKET
Filed Sept. 2, 1954 4 Sheets-Sheet 1

INVENTOR.
WALTER D. TEAGUE JR.
BY
Nicholas J. Garofalo
ATTORNEY

April 8, 1958     W. D. TEAGUE, JR     2,829,491
TWO-STAGE LIQUID FUEL ROCKET

Filed Sept. 2, 1954     4 Sheets-Sheet 3

INVENTOR.
WALTER D. TEAGUE JR.
BY
*Nicholas J. Garofalo*
ATTORNEY

April 8, 1958 W. D. TEAGUE, JR 2,829,491
TWO-STAGE LIQUID FUEL ROCKET
Filed Sept. 2, 1954 4 Sheets-Sheet 4

INVENTOR.
WALTER D. TEAGUE JR.
BY Nicholas J. Garofalo
ATTORNEY

United States Patent Office 2,829,491
Patented Apr. 8, 1958

2,829,491

TWO-STAGE LIQUID FUEL ROCKET

Walter D. Teague, Jr., Alpine, N. J., assignor to Bendix Aviation Corporation, Teterboro, N. J., a corporation of Delaware Application September 2, 1954, Serial No. 453,794

10 Claims. (Cl. 60—35.6)

This invention relates to new and useful improvements in liquid propellant rocket engines of the high output type.

In rockets of this type there is danger of the rocket exploding and blowing apart when starting because of too great a fuel flow to the combustion chamber.

The present invention contemplates means for controlling the fuel flow to the combustion chamber in stages, so as to provide a reduced flow rate for a very brief period to provide an initial combustion in order to prepare the combustion chamber for a subsequent full flow rate and full combustion. This is accomplished by improvements in the injector head whereby the injector nozzles are sealed with blowout plugs, of which only a limited number are permitted to blow out on pressurizing the propellants. This provides a reduced rate of flow to the combustion chamber for a starting combustion to prepare the chamber for a subsequent full flow rate. During this limited flow or first stage, the balance of the injector nozzles are prevented from blowing out by blocking means which hold the plugs in against the pressure of the pressurized propellants. Suitable means is provided whereby the blocking means is removed consequent upon the initial combustion action whereby the balance of the injector plugs are permitted to blow out to establish a full fuel flow rate to the combustion chamber.

A feature of the invention lies in the nature and design of the injector head to accommodate the backing means and related injector nozzles.

A further feature of the invention lies in the backing means, its association with the injector head, and in the arrangement whereby it is removed to unblock the injector nozzles.

A still further feature of the invention lies in the nature of the blowout injector plugs employed to seal the injector nozzles. These are of spherical form and provide quick blowout advantages, which lends to the operating efficiency of the rocket.

An object of the invention, therefore, is to provide new and useful improvements in a liquid propellant rocket engine.

A further object of the invention is to provide in a liquid propellant rocket engine means to provide two stages of fuel flow to the combustion chamber, a reduced rate of flow followed by a full rate of flow.

A still further object of the invention is to provide delayed injector plug blowout means in a liquid propellant rocket.

Another object of the invention is to provide an improved injector plug element.

The foregoing and other objects and advantages of the invention will appear more fully hereinafter from a consideration of the detailed description which follows, taken together with the accompanying drawings, wherein an embodiment of the invention is illustrated. It is to be expressly understood, however, that the drawings are for purposes of illustration and description, and are not to be construed as defining the limits of the invention.

Figure 1:
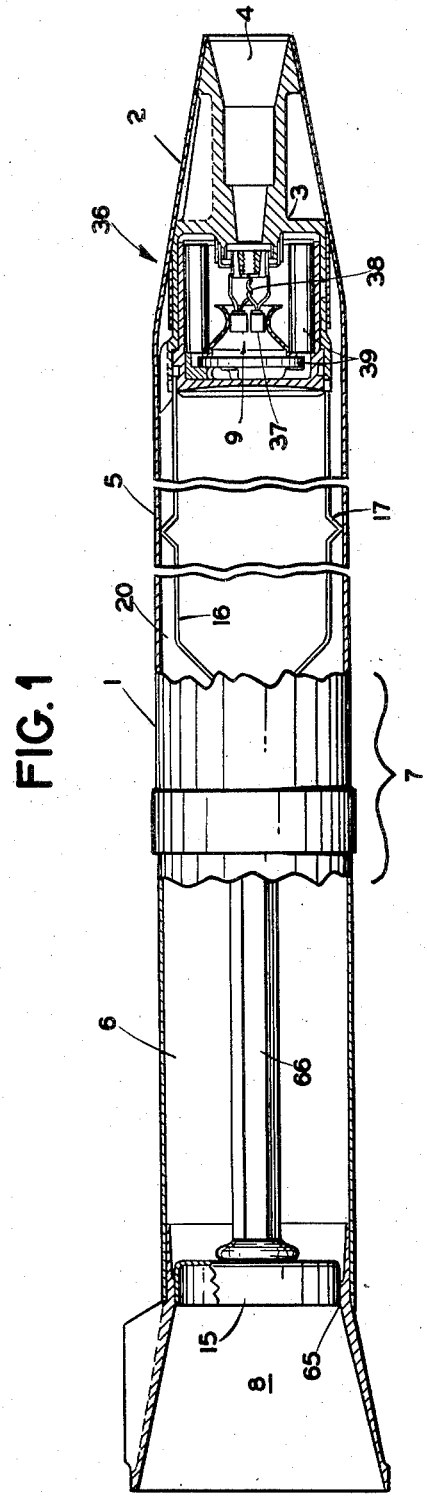
Fig. 1 is a view of a rocket engine embodying the invention.
Figure 2:
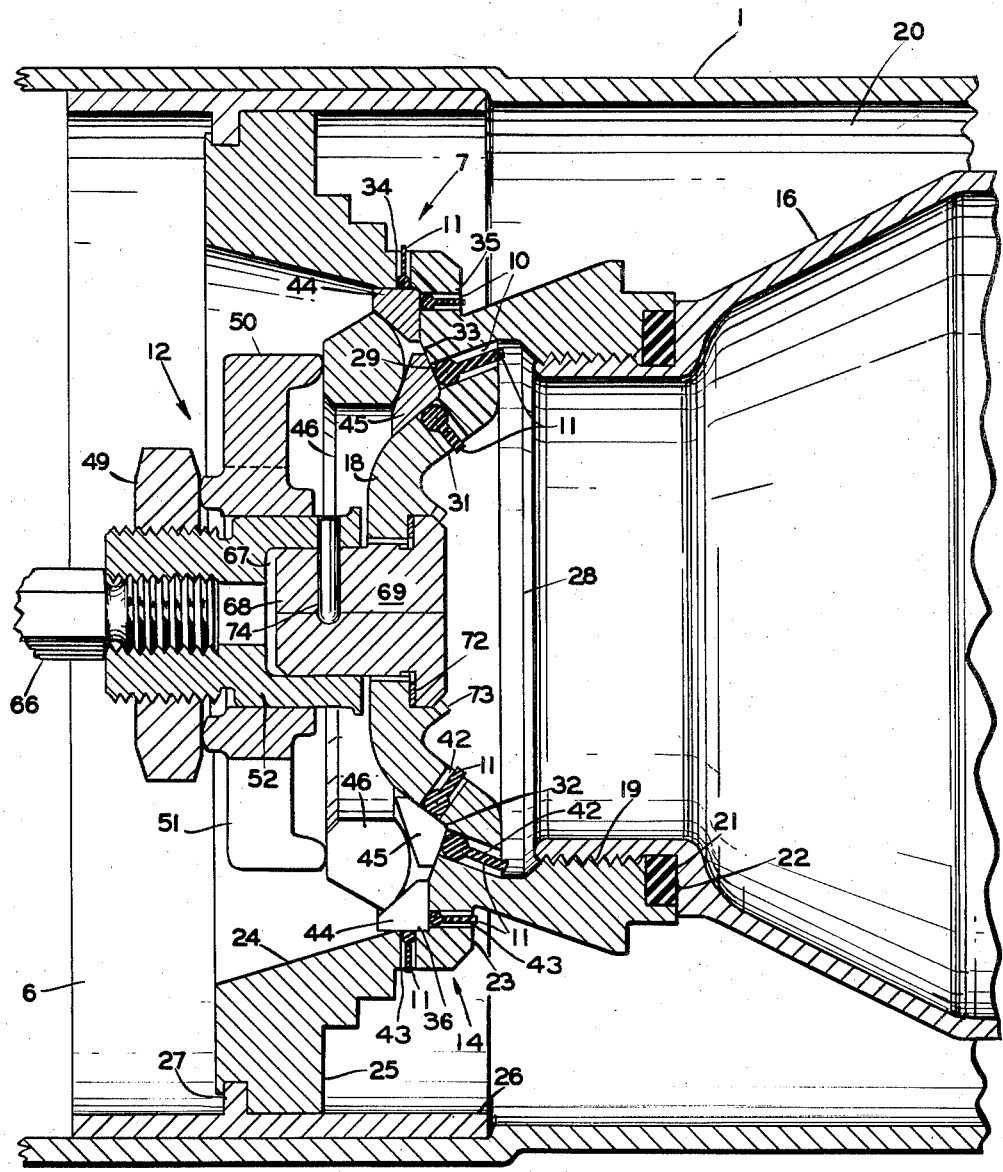
Fig. 2 is an enlargement of the bracketed portion of Fig. 1 and shows the injector head in longitudinal section on the line 2—2 of Fig. 3.
Figure 3:
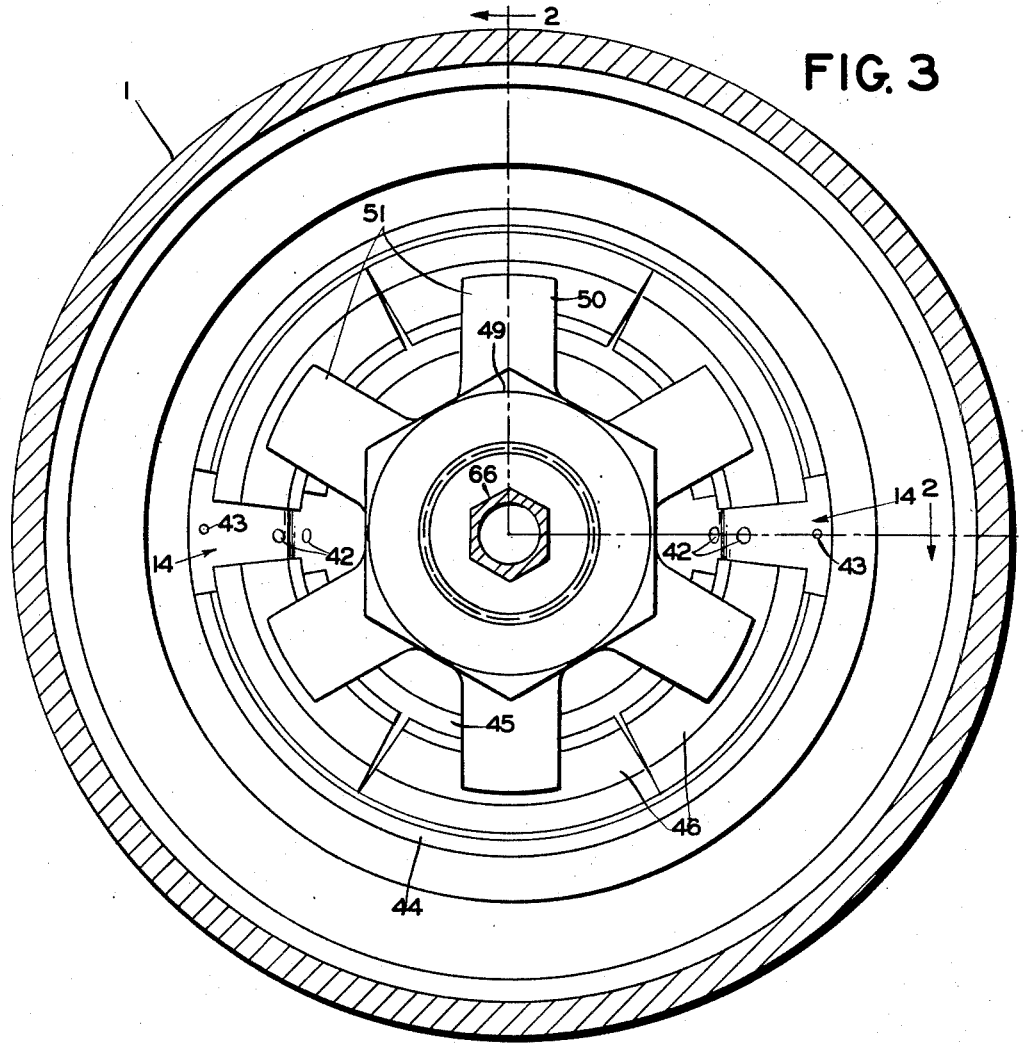
Fig. 3 is a left end view in full of Fig. 2.
Figure 4:
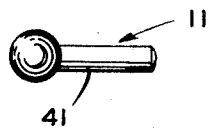
Fig. 4 is a detail of the injector plug.

In describing the invention in detail, reference is directed to the drawings, now particularly Figs. 1–4, wherein there is shown a rocket shell 1 closed over at its nose end 2 by a suitable wall 3 having an axial recessed extension 4 in which is adapted to be carried a suitable warhead, not shown. The shell includes in the body portion 5 a contained supply of liquid fuel propellants, and includes a combustion chamber 6 in the lower end of the shell in communication with the propellant supply through a suitable injector head 7. The combustion chamber is provided with a nozzle throat 8 which exhausts to the outside.

A suitable pressurizing system 9 is provided for pressurizing the propellants and forcing them to the combustion chamber through nozzles 10 provided in the injector head. The rocket is designed for a two-stage feed flow; that is, an initial or reduced rate of flow in the first stage for a few milliseconds for starting purposes in order to prepare the combustion chamber for a full feed flow in the second stage and full combustion.

To provide for the two-stage fuel flow, the nozzles of the injector head are sealed with blowout plugs 11 (Fig. 4) designed to blow out under pressure created by the pressurized propellants. Backing or blocking means 12 is provided to seal the plugs in the nozzles, with the exception of a few plugs indicated in the nozzles at 14, against being blown out under the pressurized propellants until desired. The unbacked plugs at 14 will blow out under the pressurized fluids and will provide a desired minimum flow rate to the combustion chamber for the first stage of ignition. Blowplug means indicated at 15 is connected to the blocking means 12 and seals the combustion chamber off from the exhaust throat 8. The pressure created by the burning gases during ignition in the first stage of fuel flow blows out the throat plug 15, and the latter in exiting through the exhaust throat 8 carries along with it the backing means 12. This action permits the rest of the nozzle injector plugs to be blown out, whereupon a full fuel flow rate to the combustion chamber and full combustion is provided.

The propellant components of the fuel of combustion are suitably contained in the shell. In the body of the shell is fitted a tank bottle 16 of smaller diameter than the shell. The tank has a plurality of surface protuberances 17 which abut against the shell wall and space the tank a desired distance therefrom. Bottle 16 is adapted to contain a suitable oxidizing liquid propellant fuel component, such as nitric acid. The space surrounding the bottle provides a chamber 20 concentric therewith and suited to holding a supply of a liquid propellant fuel component, such as aniline.

The bottle 16 and the chamber 20 are both sealed from the combustion chamber at their mouth ends by the injector head 7. The latter includes a crowned central cap portion 18 secured in any suitable manner about the neck of the bottle, such as threading at 19, and the sealing gasket 21 seated in a shoulder 22 at the rear end of the cap. The cap is provided about its periphery with a short flange 23 which extends rearwardly to provide a skirt portion 24. The fuel chamber is sealed from the combustion chamber in suitable manner, here by a peripheral flange 25 about the skirt. The outer surface of flange 25 contacts a sleeve 26 fixed in the shell and is secured as by welding against shoulder 27 of the sleeve.

The crown of the injector cap provides a recess 28 into which the mouth of the bottle extends. This recess communicates through the injector head with the combustion chamber through a plurality of pairs of adjacent nozzles, a nozzle 29 from each pair forming an upper ring of nozzles and a nozzle 31 from each pair forming a lower ring of nozzles. The nozzles of each pair are angularly disposed toward one another through the crown of the cap so that fluid from the bottle escaping through each nozzle will impinge together at a vertex within the combustion chamber so as to provide a fine spray. An annular shoulder or valley 32 is provided in the outer wall of the crown. The nozzles 29 of the upper ring pass through wall 33 of the valley, while the nozzles 31 of the lower ring pass through the other wall of the valley. The propellant supply chamber 20 also communicates with the combustion chamber through a plurality of pairs of adjacent nozzles, wherein a nozzle 34 of each pair forms an upper ring of nozzles and a nozzle 35 of each pair forms a lower ring of nozzles. Nozzles 34 and 35 of each pair communicate through the injector head to the combustion chamber at right angles to each other so that fluid through one impinges against fluid through the other at a vertex within the combustion chamber to provide a fine spray. A right angular annular shoulder 36 is formed at the junction of skirt 24 with flange 23. The nozzles 34 of the outer ring pass through the peripheral wall of shoulder 36 while the nozzles 35 of the inner ring pass through the right wall thereof.

The injecting nozzles 29, 31 serving the tank bottle are relatively close to those 34, 35 serving the fuel chamber, so that fluids issuing from both commingle and thoroughly mix for spontaneous combustion in the combustion chamber.

The propellants issue from the various nozzles under pressure created by the pressurizing system 9. Pressurization may be accomplished by any suitable manner or well-known methods, such as by stored gas with a regulator, pumping means, or burning of a separate powder grain. The latter is shown here. It includes an igniter system 36 mounted in a conventional container for this type of system in the rear of the shell. It carries the usual igniters 37, igniter wires 38 and solid fuel grains 39. When the fuel grains are ignited, they burn, and the gas thereof pressurizes the propellants in appropriate manner, causing the propellants from their respective containers to forcefully issue through the injector nozzles.

To provide for the two stages of fuel flow, each nozzle is sealed by a ball blowout plug 11. These are moulded of resilient material, such as rubber or the like, sufficiently resistant to the propellants. They are of a diameter slightly larger than that of the nozzles so as to provide a perfect liquid seal. It is important that the plugs blow out at low pressure for reasons as will hereinafter become apparent. Cylindrical-bodied type plugs forced into the nozzles provide too great a surface contact with the wall of the nozzle and, therefore, do not blow out readily at low pressures. Since the blow-out pressure is a function of the area of the nozzle hole and the amount of surface contact on the wall of the hole, the ball plug is ideal as the spherical shape thereof with the proper diameter gives a minimum surface contact with the wall of the nozzle hole and at the same time provides a perfect seal. To provide ease of insertion, the spherical plugs may be provided with tails 41 of small diameter. The several plugs, with the exception of the few indicated at 14, are sealed by the blocking means 12 against blowing out under the pressurized propellants. The unbacked plugs at 14, located along the horizontal diameter line in Fig. 3 comprise at 42 nozzles serving the tank bottle and at 43 nozzles serving the fuel chamber 20. The blocking means comprises a plurality of arcuate triangular blocks 44 and 45, of which those designated 44 have a right angular portion complementary to the shoulder 36 of the associated injector nozzles and adapted to seat therein over the nozzles. The blocks designated 45 have an angular portion complementary to that of the valley 32 and are adapted to seat therein over the associated nozzles. The outer faces of blocks 44 and 45 together provide a valley adapted to accommodate a plurality of arcuate retaining elements 46. The latter are each provided with a convexed face which rests in the valley and, when pressed, they force the blocks 44 and 45 into sealing position over the plugged nozzles. It is to be noted that the blocks and retainers are spaced from one another at 14 so as to leave the nozzles at this point unblocked. The retainers are held pressed against the block seals by means of a nut 49 and washer member 50, the latter having a plurality of radial fingers 51, each pressing against a retainer element 46. The washer element 50 is slidable on a hubpiece 52 and the nut is threaded on the end of the latter to force the washer fingers into pressing engagement with the retainer elements.

Figure 5:
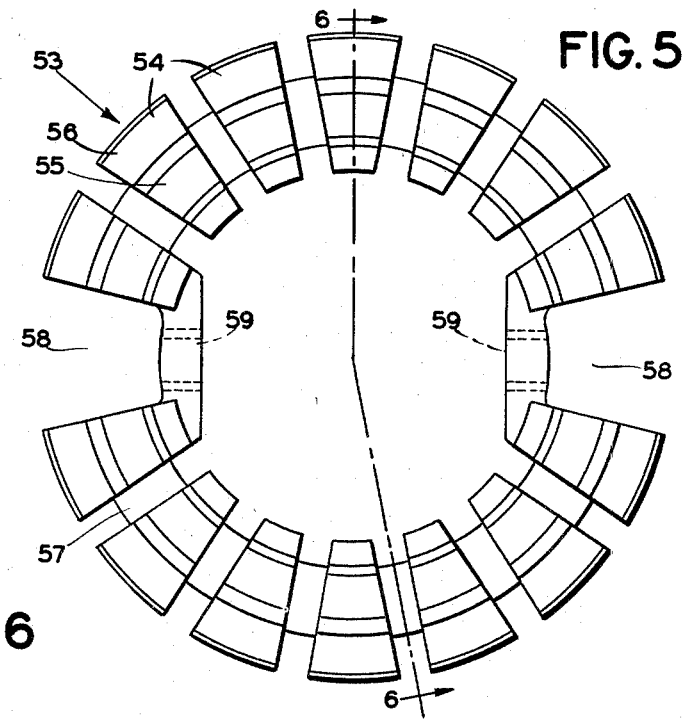
Fig. 5 is a modified form of the blocking means.
Figure 6:
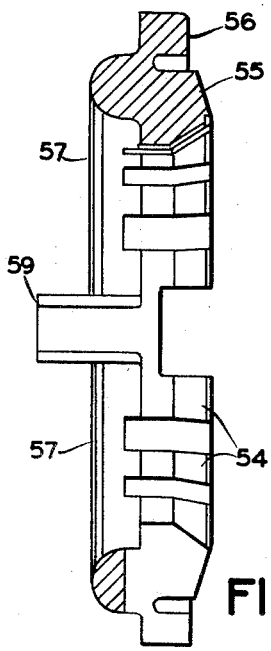
Fig. 6 is a cross section on line 6—6 of Fig. 5.
Figure 7:
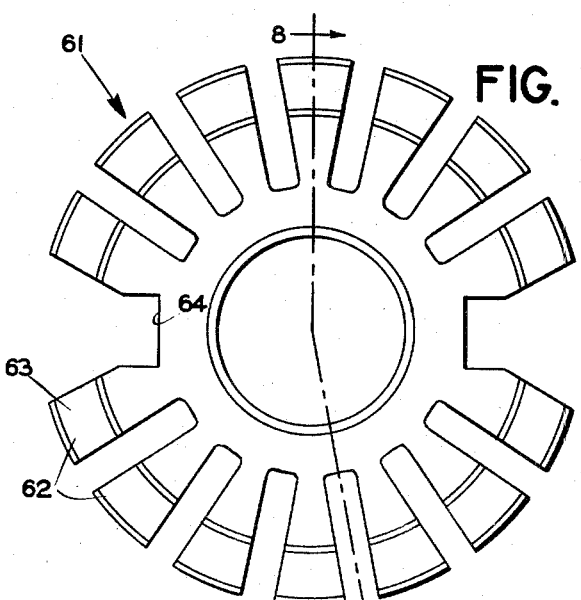
Fig. 7 is a modified form of retaining means for use in association with the means in Fig. 5.
Figure 8:
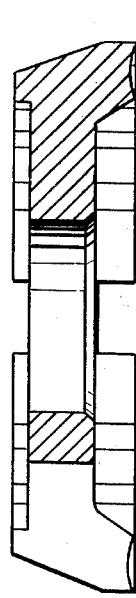
Fig. 8 is a cross section on line 8—8 of Fig. 7.

In Figs. 5–8, there is shown a modified form of the backing means. In this form (Figs. 5 and 6) the plurality of blocks are combined into a single member 53 and slightly modified. Here a plurality of fingers 54 are provided, each finger having an angular portion 55 adapted to seat in the valley 32 of the injector head to seal off a pair of nozzles serving the tank bottle, and each finger also having a rectangular portion 56 adapted to seat in the shoulder 36 to seal off a pair of nozzles serving the fuel chamber. Half of the fingers are bridged together by a convexed spine 57 and the other half are similarly bridged. A suitable space 58 is provided between each half set of fingers so that the nozzles indicated at 14 in Fig. 3 will remain unblocked. A pair of lugs 59 join both sets of fingers to one another. A retaining ring 61 (Figs. 7 and 8) comprising a number of fingers 62, one for each of the blocking fingers 54, serves in place of the washer 50 and includes an axial opening to receive the hubpiece 52. The retaining fingers 62 have a concaved underside 63 adapted to fit over the convexed spine 57 of the blocking fingers. At opposite sides of the ring a notch 64 is provided to receive lugs 59. The notches flare outward to expose the unblocked nozzles indicated at 14 in Fig. 3. The retaining ring 61 is adapted to be pressed into engagement with the finger block ring 53 by means of a suitable fastener, such as nut 49.

The throat nozzle is sealed off from the combustion chamber, as previously mentioned, by a blowout plug 15. The latter is positioned at the knee 65 of the throat, where the throat begins to expand outward. This arrangement permits the plug 15 to exit with a minimum of wall resistance when blown out. The plug is attached to the hubpiece 52 by a lightweight shaft 66, the forward end of which is secured, as by threads into the hubpiece 52. The hubpiece is provided with a counterbore 67 in its forward end, in which is received an extended shank 68 of a plug 69 that is axially held in the crown of the injector cap. Plug 69 is provided with a flange 72 limiting against a shoulder of the injector cap and contained therein by overlapping edges 73 of the shoulder. Hubpiece 52 is removable from the shank end 68, but is held united thereto by a shear pin 74.

In the operation of the device, the fuel propellants are pressurized by gases produced by setting off the igniters 37 and causing the solid fuel grains 39 to burn. The pressurized propellants cause the unbacked plugs of the nozzles at 14 to blow out, whereupon a minimum or reduced desired flow of fuel is provided to the combustion chamber 6 for the initial combustion stage. On mixing, the propellants spontaneously ignite. The increased pressure caused in the combustion chamber by the burning gases blows out the throat plug 15 and as a consequence, shears the pin 74 that holds the hubpiece. The shaft, hubpiece and backing elements are all blown out along with the throat plug. The backing elements and other parts blown out may be of moulded plastic material to prevent damage to the throat as they pass out. Removing the backing means 12 permits the rest of the injector plugs to be blown out and thus establishes for the second stage of operation a full flow rate of the propellants and a full rate of combustion. The combustion chamber, having been preheated and the pressure therein adequately built up by the first stage of operation, is prepared for the second or full stage of operation, and thereby the danger of the rocket blowing apart with a full fuel flow and full combustion is eliminated.

As previously mentioned, the spherical ball plugs 11 are desirable, as they will blow out at a low pressure. This advantage avoids a lag in the full fuel flow following the first stage of operation, whereby the combustion chamber pressure does not drop excessively in going into the second stage of operation.

It is to be noted that a limited number of the injector orifices have been left unblocked at 14 so as to provide a reduced rate of starting flow for the first stage of operation; it is to be understood that their number may be varied as may be expedient and the blocking means modified accordingly.

Although the invention has been illustrated and described as above, it is to be expressly understood that the invention is not limited thereto. Various changes can be made in the design and arrangement of the parts without departing from the spirit and scope of the invention, as the same will now be understood by those skilled in the art.

I claim:

1. In a liquid propellant rocket a supply of liquid propellants, an injector head, a combustion chamber, a plurality of injector nozzles through the injector head communicating the propellants with the combustion chamber, blowout plugs closing the injector nozzles, means for pressurizing the propellants to blow out the plugs and to issue through the nozzles to the combustion chamber for spontaneous combustion therein, means blocking all but a predetermined number of the nozzles against blowing out of the plugs therein by the pressurized propellants, a throat for exhausting gases of combustion from the combustion chamber, a blowout member closing off the throat from the combustion chamber and adapted to be blown out of the throat by the gases of combustion, and removable retaining means holding the blocking means in place and connected to the blowout member, the retaining means adapted to be carried out of the throat with the blowout member and thereby to release the blocking means for the plugs.

2. In a rocket as in claim 1, wherein the blowout plugs are spherical in shape, of a diameter slightly larger than that of an injector nozzle, and formed of resilient material resistant to chemical action of the liquid propellants.

3. In a rocket as in claim 1, wherein the blowout plugs are spherical in form, of resilient material and each of a diameter only slightly larger than that of the injector nozzle in which it is fitted whereby the plug affords a minimum of surface contact with the wall of the orifice.

4. In a rocket as in claim 1, wherein the injector nozzles communicate through the injector head to the combustion chamber through adjacent walls of an angular shoulder, and the blocking means includes a plurality of members providing an angular portion complementary to that of the shoulder and adapted to seat therein over the exit ends of the nozzles.

5. In a rocket as in claim 1, wherein the means for pressurizing the propellants comprises an igniter system including means for igniting solid fuel grains in a confined chamber, and means actuable by the pressure developed by the burning gases within the chamber to pressurize the propellants.

6. A liquid fuel propellant rocket of the character described comprising a rocket shell including containers of liquid propellants combustible on mixing, a combustion chamber, an injector head having a plurality of injector nozzles for communicating the propellants to the combustion chamber, means for pressurizing the propellants through the injector nozzles, blowout plugs in the nozzles sealing them against passage of unpressurized propellants, the plugs adapted to be blown out on pressurization of the propellants, a throat for exhausting gases of combustion from the combustion chamber, a blowout member sealing the latter chamber off from the throat, blocking means sealing all of the blowout nozzle plugs with the exception of a few against being blown out when the propellants are pressurized by the pressurizing means, means joining the blocking means with the blowout member, the unblocked nozzle plugs adapted to blow out on pressurization of the propellants and to allow a reduced propellant flow rate to the combustion chamber for ignition, the blowout member adapted to be blown out through the throat by the gases of combustion in the combustion chamber consequent to such ignition and to pull the blocking means away from the other nozzle plugs, and the latter plugs adapted on release of the blocking means to blow out under the pressurized propellants whereby full propellant flow rate is established to the combustion chamber.

7. In a rocket as in claim 6, wherein the blocking means comprises a ring having a plurality of fingers each adapted to seat over certain of the nozzles, and means on the injector head for retaining the fingers of the ring tightly over the nozzles to seal the latter against blowing out of the blowout plugs on pressurization of the propellants.

8. In a rocket as in claim 6, wherein the blocking means comprises a ring having a plurality of fingers, each adapted to seat over certain of the nozzles, a hub centrally of the injector head, a hubpiece united to the latter by a shear pin, a shaft axially connecting the hubpiece to the blowout member, a retaining ring carried on the hubpiece and adapted to slide into abutment against the fingers, a lock nut threaded onto the end of the hubpiece and adapted to slide the retaining ring firmly against the fingers so as to block escape of the nozzles on pressurization of the propellants, the shear pin adapted to be sheared upon the blowout member being blown out, and the shaft together with the hubpiece and nut thereon adapted to be carried out of the throat with the blowout member so as to free the nozzles from the sealing effect of the blocking means.

9. In a rocket as in claim 6, wherein the throat is of the expansion type having a constricted portion and an expanded part flaring out from the constricted portion, and the blowout member is positioned across the constricted portion whereby a minimum of resistance is afforded to the blowout member when exiting from the throat.

10. In a rocket as in claim 6, wherein the plugs are spherical in form and when contained in the nozzles afford a minimum of surface contact with the walls of the nozzles whereby they are, when unblocked, adapted to be blown out upon a low pressure force exerted against them by the pressurized propellants.

References Cited in the file of this patent

UNITED STATES PATENTS

| 2,200,922 | Heigis | May 14, 1940 |
| 2,371,293 | Hoof | Mar. 13, 1945 |
| 2,671,312 | Roy | Mar. 9, 1954 |
| 2,708,342 | Allen | May 17, 1955 |